United States Patent
Xhakoni et al.

(10) Patent No.: US 12,375,832 B2
(45) Date of Patent: Jul. 29, 2025

(54) PIXEL, ELECTRIC DEVICE AND METHOD HAVING A TRANSFER GATE AND SAMPLE STAGES CONFIGURED TO BE OPERATED IN CONJUNCTION WITH A LIGHT SOURCE IN RESPONSE TO A CONTROL SIGNAL

(71) Applicant: ams Sensors Belgium BVBA, Antwerp (BE)

(72) Inventors: Adi Xhakoni, Kessel Lo (BE); Xiaoliang Ge, Antwerp (BE)

(73) Assignee: AMS SENSORS BELGIUM BVBA, Antwerp (BE)

( * ) Notice: Subject to any disclaimer, the term of this patent is extended or adjusted under 35 U.S.C. 154(b) by 255 days.

(21) Appl. No.: 18/002,413

(22) PCT Filed: Jun. 17, 2021

(86) PCT No.: PCT/EP2021/066353
§ 371 (c)(1),
(2) Date: Dec. 19, 2022

(87) PCT Pub. No.: WO2021/259744
PCT Pub. Date: Dec. 30, 2021

(65) Prior Publication Data
US 2023/0232132 A1   Jul. 20, 2023

(30) Foreign Application Priority Data
Jun. 26, 2020   (EP) .................................... 20182563

(51) Int. Cl.
H04N 5/335    (2011.01)
H04N 25/532   (2023.01)
(Continued)

(52) U.S. Cl.
CPC ......... *H04N 25/771* (2023.01); *H04N 25/532* (2023.01); *H04N 25/78* (2023.01); *G03B 15/02* (2013.01)

(58) Field of Classification Search
CPC .................................................... H04N 25/771
See application file for complete search history.

(56) References Cited

U.S. PATENT DOCUMENTS

2017/0013210 A1 * 1/2017 Hsu ...................... H04N 23/80
2017/0324920 A1   11/2017 Vogelsang et al.
(Continued)

FOREIGN PATENT DOCUMENTS

| | | |
|---|---|---|
| CN | 206908723 U | 1/2018 |
| CN | 108391066 A | 8/2018 |

(Continued)

OTHER PUBLICATIONS

Chinese Office Action issued in corresponding Chinese Patent Application No. 202180042703.9, dated Sep. 21, 2024, with English language translation, 17 pages.
(Continued)

*Primary Examiner* — Gary C Vieaux
(74) *Attorney, Agent, or Firm* — MH2 Technology Law Group LLP (57) ABSTRACT

A pixel includes a transfer gate, and a sample structure having a first sample stage and a second sample stage. The transfer gate and the first and the second sample stages are configured to be operated in conjunction with a light source in response to a control signal. The first sample stage is configured to sample a first sample value that depends on radiation incident on the photosensitive element from an object or a scene that is illuminated by the light source emitting light at a first output power, while the second sample stage is configured to sample a second sample value (Continued)

that depends on radiation incident on the photosensitive element from the object or the scene that is illuminated by the light source emitting light at a second output power. The first output power is different, in particular significantly different, from the second output power.

13 Claims, 4 Drawing Sheets

(51) Int. Cl.
*H04N 25/771* (2023.01)
*H04N 25/78* (2023.01)
*G03B 15/02* (2021.01)

(56) References Cited

U.S. PATENT DOCUMENTS

| 2017/0366766 | A1 | 12/2017 | Geurts et al. |
| 2021/0160448 | A1* | 5/2021 | Seo .................. H01L 27/14621 |
| 2021/0235027 | A1* | 7/2021 | Meynants .............. H04N 25/78 |
| 2021/0258530 | A1* | 8/2021 | Scott .................... H04N 25/771 |

FOREIGN PATENT DOCUMENTS

| EP | 2109306 A2 | 3/2015 | |
| WO | WO-2020025328 A1 * | 2/2020 | ....... H01L 27/14641 |

OTHER PUBLICATIONS

Han et al., "A Time-of-Flight Range Image Sensor With Background Canceling Lock-in Pixels Based on Lateral Electric Field Charge Modulation", Journal of the Electron Devices Society, vol. 3, No. 3, May 2015, 9 pages.

Wang et al., "Compact Ambient Light Cancellation Design and Optimization for 3D Time-of-Flight Image Sensors", Conference: 2013 International Image Sensor Workshop, Jun. 2013, 4 pages.

International Search Report and Written Opinion in Corresponding International Application No. PCT/EP2021/066353 mailed on Aug. 3, 2021, 11 pages.

Chinese Office Action issued in corresponding Chinese Patent Application No. 202180042703.9, dated Mar. 7, 2025, 15 pages.

* cited by examiner

PIXEL, ELECTRIC DEVICE AND METHOD HAVING A TRANSFER GATE AND SAMPLE STAGES CONFIGURED TO BE OPERATED IN CONJUNCTION WITH A LIGHT SOURCE IN RESPONSE TO A CONTROL SIGNAL

CROSS-REFERENCE TO RELATED APPLICATIONS

The present application is the national stage entry of International Patent Application No. PCT/EP2021/066353, filed on Jun. 17, 2021, and published as WO 2021/259744 A1 on Dec. 30, 2021, which claims priority to European Patent Application No. 20182563.5, filed on Jun. 26, 2020, all of which are incorporated by reference herein in their entireties.

FIELD OF THE INVENTION

This disclosure relates to a pixel, in particular to a pixel having two storage nodes, and to a method for operating such a pixel.

BACKGROUND OF THE INVENTION

CMOS image sensors are used in a wide range of applications, such as for example camera modules and smartphones, tablet computers, laptops, etc. In many of these applications, a background subtraction process is applied at least in some capturing modes in order to improve the image quality. Particularly in applications employing light sources for illuminating an object or a scene to be captured, e.g. for facial or fingerprint recognition applications, background illumination that is too strong can lead to a low signal of the object or of the scene in the captured images due to the limited dynamic range of pixels of image sensors.

Conventional pixels and image sensors typically overcome background lighting that is too strong and achieve an enhanced signal-to-noise ratio in the pixels by increasing the power of the light source for a higher degree of illumination. However, such solutions are only minimally suitable for systems that are often characterized by a limited power budget. Alternative solutions employ background subtraction of the pixel signals in post processing, which leads to additional required circuitry and computational power and possible to multiple exposures and thus to a large power consumption.

An object to be achieved is to provide an improved concept of a pixel that overcomes the limitations of conventional pixels.

This object is achieved with the subject-matter of the independent claims. Embodiments and developments of the improved concept are defined in the dependent claims.

SUMMARY OF THE INVENTION

The improved concept is based on the idea of providing a pixel in which a background light cancellation operation can be executed within the pixel during the image acquisition phase, thus relaxing the need for off-chip data buffer or storage while improving the contrast and detection probability in the image. To this end, a pixel according to the improved concept comprises two sample stages for sampling photo signals at different light levels.

A pixel according to the improved concept comprises a photosensitive element for generating charges in response to incident radiation, a sense node, and a transfer gate that is connected between the photosensitive element and the sense node for controlling transfer of charges to the sense node. The pixel further comprises a first buffer amplifier having an input connected to the sense node, and a sample structure connected to an output of the first buffer amplifier, wherein the sample structure comprises a first sample stage and a second sample stage. The first and the second sample stages are selectively operable to sample a sample value of the sense node.

The transfer gate and the first and the second sample stages are configured to be operated in conjunction with a light source in response to a control signal. The first sample stage is configured to sample a first sample value that depends on radiation that is incident on the photosensitive element from an object or a scene that is illuminated by the light source emitting light at a first output power. Analogously, the second sample stage is configured to sample a second sample value that depends on radiation that is incident on the photosensitive element from the object or the scene that is illuminated by the light source emitting light at a second output power. Therein, the first output power is different, in particular significantly different, from the second output power.

The pixel is configured to capture optical information that is incident upon the respective pixel and to generate electrical information representative of this optical information. Especially for pixels and image sensors fabricated according to standard CMOS technologies, the working principle of the pixels is the conversion of optical intensity into a photocurrent using a photodiode, for example a pinned photodiode. Silicon-based photodiodes are a common choice in this connection, as these diodes are sensitive over a broad wavelength range between 190 nm and 1100 nm and therefore cover the relevant part of the electromagnetic spectrum in both the visible and the infrared domain.

The photosensitive element, the transfer gate connected to the photosensitive element, the sense node, often also referred to as the floating diffusion, connected to the transfer gate, and the first buffer amplifier connected between the sense node and the sample structure, are standard elements of typical CMOS pixels and are not further elaborated in this disclosure.

The sample structure is capable of storing a plurality of, e.g. two, sample values of the sense node. To that end, the sample structure comprises a first sample stage having a first storage element, and a second sample stage having a second storage element. For example, the first and the second storage elements are realized as capacitors. Furthermore, the sample structure is configured to selectively operate the first and the second sample stages. This means that the sample structure is configured to activate and to suspend paths connecting the first buffer amplifier and the storage elements of the sample stages. For example, the sample structure comprises a plurality of sample switches, e.g. each realized as a transistor that receives a switching signal at the respective gate, for selectively operating the first and the second sample stages.

The transfer gate and the first and the second sample stages being configured to be operated in conjunction with the light source in response to a control signal means that the readout of the photocurrent from the photosensitive element as well the storing of said signal to the respective sample stages can be synchronized to a light source, e.g. an LED or a laser diode. For example, the light source is configured to emit broadband light in the visible domain or monochromatic or narrowband light in the infrared domain, e.g. at or around 940 nm.

In this way, a first sample value, which depends on a photocurrent that is generated during a first exposure period and for a first output power of the light source, can be stored on the storage element of the first sample stage. Analogously, a second sample value, which depends on a photocurrent that is generated during a second exposure period and for a second output power of the light source, can be stored on the storage element of the second sample stage. Therein, the first output power is different from the second output power. In other words, the first exposure period differs from the second exposure period in terms of the illumination level created by the light source. For example, the first output power differs from the second output power by an order of magnitude. Alternatively, the first or the second output power is zero. Furthermore, in some cases the first output power can correspond to the second output power.

With such a pixel according to the improved concept, a background image subtraction process can be realized, wherein the first and the second sample stages sample and store respective photo signals that have been captured by means of the photosensitive element with the same exposure time but different lighting conditions. For example, a first photo signal is based on an exposure, during which the light source for illuminating an object or a scene to be captured is activated in terms of light emission, while a second photo signal is based on an exposure, during which the light source is disabled in terms of light emission. The differential signal as a result of the background image subtraction process can be calculated either on-chip or off-chip. However, the former execution of the subtraction operation inside the pixel during the image acquisition phase can eliminate the need for off-chip data buffer or storage.

In particular, the proposed pixel structure according to the improved concept enables an in-pixel background light cancellation function for global shutter operated pixels, for instance.

In some embodiments, the pixel or a plurality of pixels further comprises a controller that controls the transfer gate and the first and the second sample stages in response to the control signal.

In such embodiments the controller is configured to operate the readout and storage of the photo signal from the photosensitive element. The control signal therefore controls the transfer gate to transfer charges from the photosensitive element to the floating diffusion, and sample switches of the first and the second sample stages in order to transfer charges from the sense node via the first buffer amplifier to the respective one of the first and the second sample stages, for instance.

In some embodiments, the control signal is configured to set the output power of the light source.

In order to acquire an image with background light cancellation, a light source, e.g. a laser or an LED, is controlled in synchronization with the pixel or an image sensor comprising a plurality of pixels according to the improved concept during the exposure phase.

In some embodiments, the control signal is configured to operate the transfer gate and the first sample stage, in particular a first switch of the first sample stage, to sample the first sample value when the light source emits light at the first output power.

In some embodiments, the control signal is configured to operate the transfer gate and the second sample stage, in particular a second switch of the second sample stage, to sample the second sample value when the light source emits light at the second output power.

For synchronization purposes, the control signal in these embodiments is set to coordinate the operation of the pixel such as to realize the storage of two photo signals that have been generated based on separate exposures of the photosensitive element with the same exposure time but different light emissions of the light source.

In some embodiments, the first output power is significantly larger or smaller than the second output power.

For realizing a background subtraction process, photo signals stored on the first and second sample stages are based on the above-mentioned exposures at different illumination levels. To this end, a first exposure is performed at a specific first output power, i.e. light emission level, of the light source that is controlled in synchronization with the pixel by means of the control signal. Analogously, a second exposure is performed at a specific second output power that is different from the first output power. For example, the first output power or the second output power is zero. Therein, the order whether the first or the second output power is larger can be chosen arbitrarily.

In some embodiments, the transfer gate is configured to transfer substantially all charge from the photosensitive element to the sense node when the transfer gate is opened.

A charge capacity of the sense node in these embodiments can be chosen to be larger than that of the photosensitive element, e.g. a pinned photodiode, such that all photo charges generated during an exposure are transferred to the sense node when the transfer gate is opened.

In some embodiments, a well capacity of the sense node is larger than a well capacity of the photosensitive element.

In these embodiments, the control signal can apply multiple pulses to the transfer gate, which allows the pixel to accumulate more charges particularly in situations when the background light is strong and a saturation needs to be taken into account, for instance.

In some embodiments, the first and the second sample stages of the sample structure are arranged in series.

In alternative embodiments, the first and the second sample stages of the sample structure are arranged in parallel.

The improved concept is applicable to pixel structures that are characterized by comprising at least two sample stages, which are selectively operable. In particular, pixel designs with typical serial or parallel configuration of the sample stages can be employed in order to realize a pixel according to the improved concept.

In some embodiments, the pixel further comprises a readout circuit having an input connected to the sample structure and being configured to generate a first output signal by reading out the first sample value from the first sample stage, and to generate a second output signal by reading out the second sample value from the second sample stage.

Like being selectively operable to sample and store photo signals from the sense node, the first and the second sample stage can likewise be selectively operable to be read out by means of a readout circuit. For example, the latter can be configured to first read out the signal stored in the first sample stage, and subsequently the signal stored in the second sample stage, or vice versa.

In some further embodiments, the readout circuit is further configured to generate a differential signal from the first and the second output signals.

The readout circuit can be further configured to generate the differential signal, i.e. to perform the background subtraction operation. To this end, the readout circuit can comprise circuitry for reading out the photo signals stored on the first and the second sample stages and to calculate a differential signal, e.g. by calculating a difference, from the two photo signals.

In some embodiments, the pixel further comprises a reset switch that is configured to be operated in conjunction with the light source in response to the control signal, with the reset switch being connected to the sense node for resetting the sense node and/or the photosensitive element to a predetermined voltage.

Before each exposure period, a reset switch can be controlled by means of the control signal to reset the photosensitive element to a known predetermined state, such that the initial situation for each exposure is the same.

The aforementioned object is further solved by an electronic device comprising an array of pixels according to one of the aforementioned embodiments, a light source, and a control circuit having a controller that is configured to generate the control signal for operating the array of pixels in conjunction with the light source.

For example, the electronic device comprises an image sensor, e.g. a CMOS image sensor, which comprises an array of pixels according to the improved concept. Therein, either each pixel or the image sensor comprises a controller for performing the aforementioned operations of controlling the sampling and storing of two different photo signals on the first and the second sample stages of each pixel, respectively. For example, the electronic device is a mobile device such as a smartphone, a portable computer, a wearable, or the like comprising an image sensor for imaging and/or identification purposes. Moreover, a pixel according to the improved concept can be employed in time-of-flight (ToF) sensors for distance measurements, for instance.

The aforementioned object is further solved by a method for operating a pixel. The method comprises generating, by means of a photosensitive element, charges in response to incident radiation and transferring the charges to a sense node via a transfer gate. The method further comprises selectively operating a first sample stage and a second sample stage of a sample structure to sample a sample value of the sense node. The method further comprises operating the transfer gate and the first and the second sample stages in conjunction with a light source, in particular with an output power of a light source, in response to a control signal.

The method further comprises sampling by means of the first sample stage a first sample value that depends on radiation incident on the photosensitive element from an object or a scene that is illuminated by the light source emitting light at a first output power. The method further comprises sampling by means of the second sample stage a second sample value that depends on radiation incident on the photosensitive element from the object or the scene that is illuminated by the light source emitting light at a second output power. Therein, the first output power is different, in particular significantly different, from the second output power.

Further embodiments of the method become apparent to the skilled reader from the embodiments of the pixel described above.

BRIEF DESCRIPTION OF THE DRAWINGS

The following description of figures of exemplary embodiments may further illustrate and explain aspects of the improved concept. Components and parts of the pixel with the same structure and the same effect, respectively, appear with equivalent reference symbols. Insofar as components and parts of the pixel cell correspond to one another in terms of their function in different figures, the description thereof is not repeated for each of the following figures.

In the Figures.

DETAILED DESCRIPTION

Figure 1:
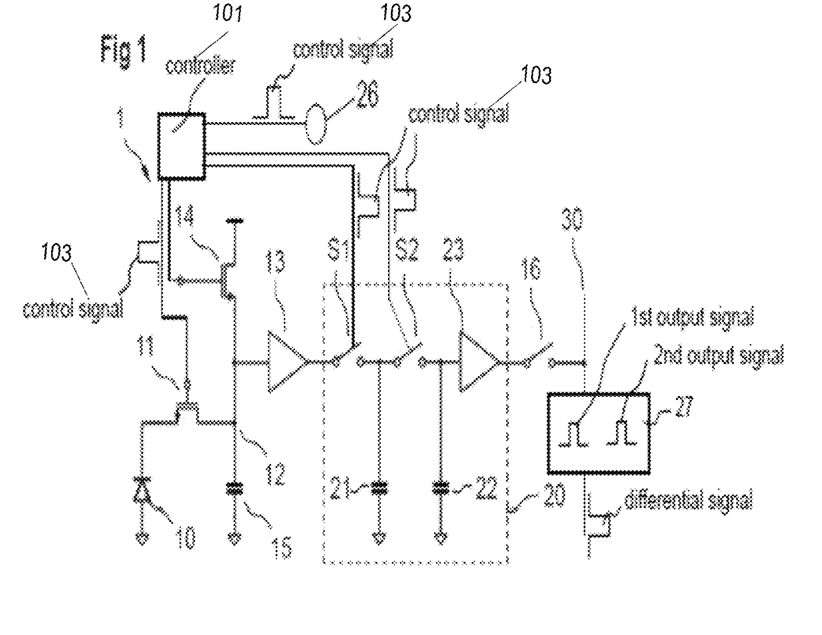
FIGS. 1 to 4 show exemplary embodiments of a pixel according to the improved concept.

FIG. 1 shows a schematic of an exemplary embodiment of a pixel 1 according to the improved concept. The pixels comprises a photosensitive element 10 for generating an electrical signal that depends on electromagnetic radiation that is incident on the photosensitive elements 10 and generates charges within the latter based on the photoelectric effect. For example, the photosensitive element 10 is a photodiode, in particular a pinned photodiode.

The pixel 1 further comprises a transfer gate 11 and a sense node 12, wherein the transfer gate 11 is connected between the photosensitive element 10 and the sense node 12. The transfer gate 11 is configured to provide an electrical connection between the photosensitive element 10 and the sense node 12 upon receiving a particular control signal that opens the transfer gate 11. The sense node 12, often also referred to as a floating diffusion, is a node that is electrically isolated from other nodes of the pixel. Typically, a floating diffusion is realized by a quasi-neutral region that is isolated by p-n junctions. Thus, its potential is determined exclusively by the amount of charge stored in it, and its capacitance. The latter can be determined by means of a floating diffusion capacitance 15.

The pixel 1 further comprises a reset switch 14 for resetting the sense node 12 and/or the photosensitive element 10 to a predetermined voltage or potential. For example, the photosensitive element 10 is reset to a specific voltage before an exposure. Analogously, the sense node 12 is reset to a specific voltage before charges and transferred from the photosensitive element 10 through the transfer gate 11 and after charges are transferred from the sense node 12 to the sampling structure 20.

Furthermore, the pixel 1 comprises a first buffer amplifier 13, typically also referred to as a source follower, that is connected to the sense node 12. The first buffer amplifier 13 is configured to amplify the often small signal of the sense node 12 before providing said signal to the sampling structure 20.

The sample structure 20 comprises a first sample stage 21 and a second sample stage 22 connected in a series configuration. The sample stages 21, 22 in this embodiment each comprise a storage capacitor for storing electric signals as a capacitance. The sample structure 20 further comprises a first sample switch S1 and a second sample switch S2 for selectively operating the first and the second sample stages 21, 22. It this embodiment, the first sample switch S1 is in a closed state while the second sample switch S2 is in an open state when a signal is to be transferred from the sense node 12 to the first sample stage 21. Analogously, both the first and the second sample switches S1, S2 are in a closed state when a signal is to be transferred from the sense node 12 to the second sample stage 22. As in some cases both sample stages 21, 22 have an electrical connection to the first buffer amplifier 13 and thus to the sense node 12, and effective total capacitance that is different from a capacitance of the second sample stage 22 has to be taken into account, particularly when reading out and further processing the signals from the first and the second sample stages.

The sample structure further comprises a second buffer amplifier 23 for further amplifying signals read out from the first and the second sample stages 21, 22 before providing them to an evaluation circuit via a readout switch 16 and a column line 30 of the pixel 1.

According to the improved concept, the pixel 1 is controlled in synchronization with a light source 26 for acquiring an image and enabling background light cancellation. The pixel 1 can be operated as follows:

1. A first exposure of the photosensitive element 10 is performed under background light conditions. At the start of this exposure period with disabled emission of the light source, photo carriers are integrated in the photodiode of the pixel.
2. At the end of this exposure period, the sense node 12 is reset to a predetermined level by pulsing the reset switch 14.
3. Subsequently, charges are transferred through the transfer gate 11 to the sense node 12 by pulsing the latter as to open the transfer gate 11. The signal is buffered by the first buffer amplifier 13 and stored on the storage capacitor of the second sample stage 22 as background signal $V_{BG}$ by pulsing the first and second sample switches S1 and S2.
4. After this charge transfer the photodiode is depleted, i.e. all charges are transferred from the photodiode via the sense node 12 and the first buffer amplifier 13 to the storage capacitor. An additional reset phase can be generated to ensure that indeed all charges evacuated from the photosensitive elements 10. This reset is realized by pulsing both the reset transistor 14 and the transfer gate 11.
5. A second exposure of the photosensitive elements 10 is performed under illumination conditions, i.e. with enabled emission of the light source. Again, photo carriers are integrated on the photodiode.
6. After again resetting the sense node 12 and by pulsing the reset switch 14, charges are transferred through the transfer gate 11 to the sense node 12 by pulsing the latter as to open the transfer gate 11. The signal is again buffered by the first amplifier 13 and in this step stored on the storage capacitor of the first sample stage 21 as signal $V_{SIG}$ by pulsing the first sample switch S1.

For global shutter operation of an image sensor comprising a plurality of pixels 1 according to the improved concept, all of the above operations occur synchronously for all pixels 1.

The pixel 1 can further comprise circuitry of a readout circuit for performing the following operations. The readout circuit can be arranged before or after the column line 30 and for illustration purposes is not shown in the figure. Moreover, the pixel 1 can comprise a controller 101 for generating the control signal 103 for operating the transfer gate 11, the reset switch 14, and the first and second sample switches S1, S2.

7. After the image acquisition sequence, the readout of the frame can start. To read out the frame which has been acquired, the background signal V_BG sampled by the second sample stage 22 is read out through the second buffer amplifier 23 and the reset switch 16 and the resulting output signal $V_{out,1}$ at the column line 30 can be written as:

$V_{out,1} = V_{BG}.$

8. Afterwards, the second sample switch S2 is pulsed to be put in a closed state to enable charge sharing between the storage capacitors of the first and the second sample stages 21, 22. After pulsing the second sample switch S2 to put the latter in an opened state, the resulting output signal $V_{out,2}$ transferred to the column line 30 can be written as:

$V_{out,2} = (V_{SIG} + V_{BG}) \cdot (C_1/(C_1+C_2)),$ wherein $C_1$ and $C_2$ denote the capacitances of the storage capacitors of the first and second sample stages 21, 22, respectively.

9. For performing the background cancellation, the difference $V_{out}$ between the two signals $V_{out,1}$ and $V_{out,2}$ can be calculated either by analog or digital circuitry and be output from the pixel as:

$V_{out} = (V_{SIG} - V_{BG}) \cdot (C_1/(C_1+C_2)).$

In an image sensor comprising a plurality of pixels 1 according to the improved concept, this readout operation is performed row-by-row sequentially by scanning over the array of pixels 1, wherein this can be achieved without disturbing the signal stored on the photosensitive element 10 of each pixel 1.

It is noted, that the described order can be alternated particularly in terms of the exposures. For example, the first exposure can be performed with the light source having enabled light emission, while the second exposure is the described background light exposure. Likewise, the two exposures can both be performed with enabled light emission of the light source, e.g. at different output powers.

Figure 2:
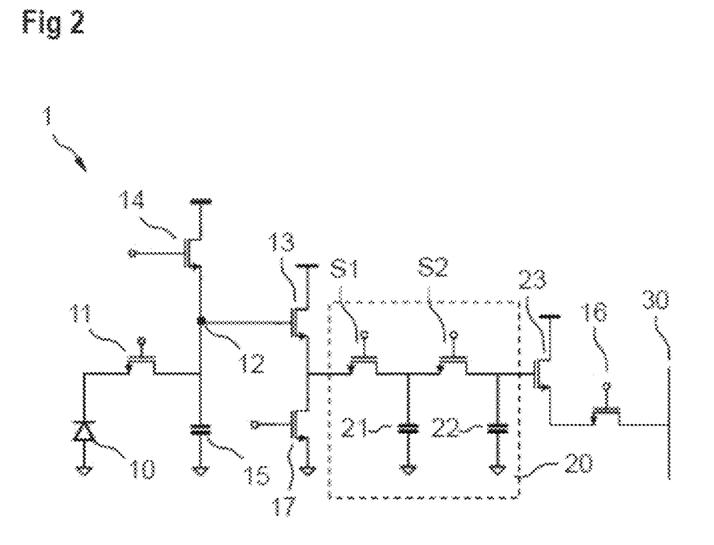

FIG. 2 shows a schematic of an exemplary embodiment of a pixel 1 that is similar to that of FIG. 1. In this figure, the first and the second buffer amplifiers 13, 23 as well as the reset switch 16 are shown to be realized as transistors, a common choice for switches employed in pixels. Moreover, the pixel 1 in this embodiment further comprises a precharge transistor 17 that is configured as a load transistor and acts as a current source for the first buffer amplifier 13.

Alternatively or in addition, the precharge transistor 17 may be used to discharge one or both of the storage capacitors of the first and second sample stages 21, 22 of the sampling structure 20 before sampling of the voltage signal from the floating diffusion 12.

Figure 3:
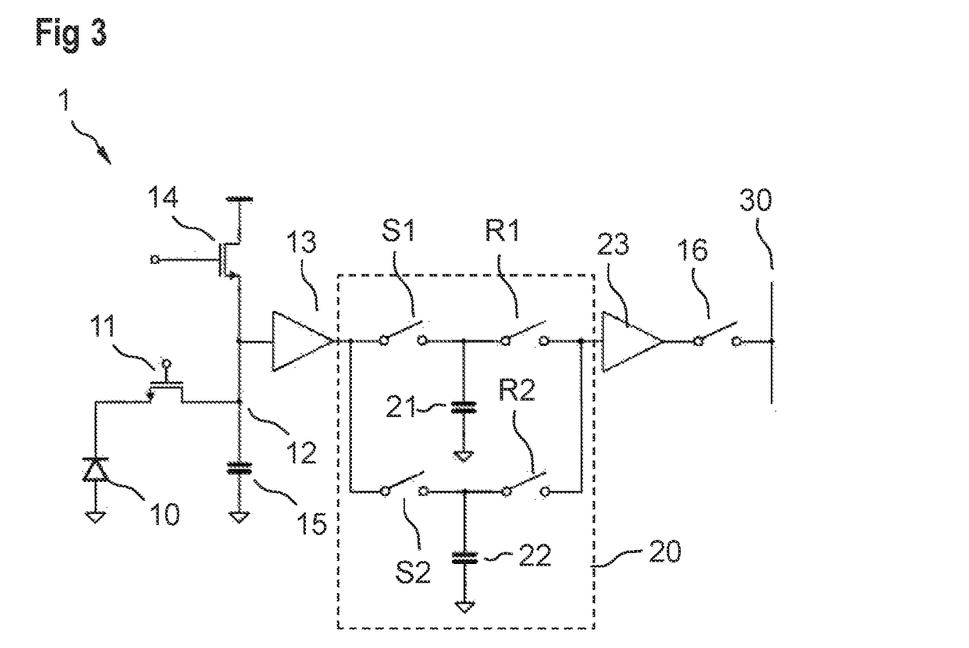
Figure 4:
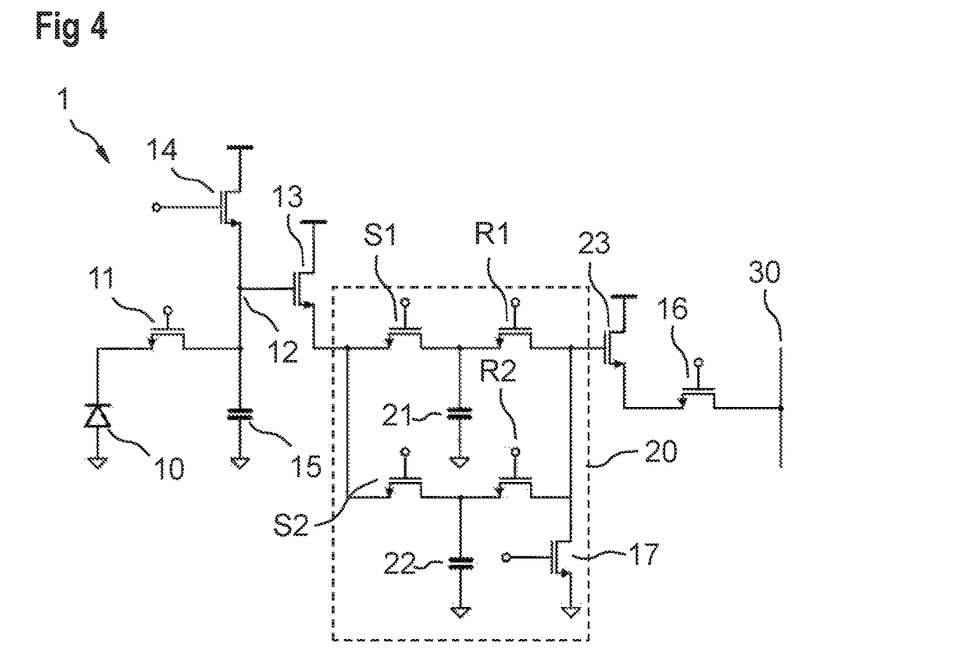

FIGS. 3 and 4 show exemplary embodiments of a pixel 1 according to the improved concept, wherein the sampling structure 20 comprises a first and a second sample stage 21, 22 that are arranged in a parallel configuration in contrast to the serial configuration of FIGS. 1 and 2. As a consequence, the sampling structure comprises additional first and second readout switches R1, R2 for transferring the respective charges from the storage capacitors of the first and the second sample stages 21, 22 via the second buffer amplifier 23 and the readout switch 16 to the column output 30.

With a parallel configuration, the two sample stages 21, 22 can be selectively and independently operated without having the charge transfer of the serial configuration described above. Thus, this configuration simplifies a background cancellation process at the cost of additional components, i.e. transistors. The working principle of operating a pixel 1 with first and second sample stages 21, 22 arranged in parallel, however, remain analogous to the operation described above with respect to the serial configuration.

It is noted, that the above-mentioned operation principle can be applied also to alternative pixel architectures that are characterized by additional components, such as additional photosensitive elements 10 or transistors, however, comprising at least two sample stages that are selectively operable. In particular, the above-mentioned operation principle can be applied to various architectures that are based on or derived from 3T (three transistor) and 4T (four transistor) pixel architectures.

Figure 5:
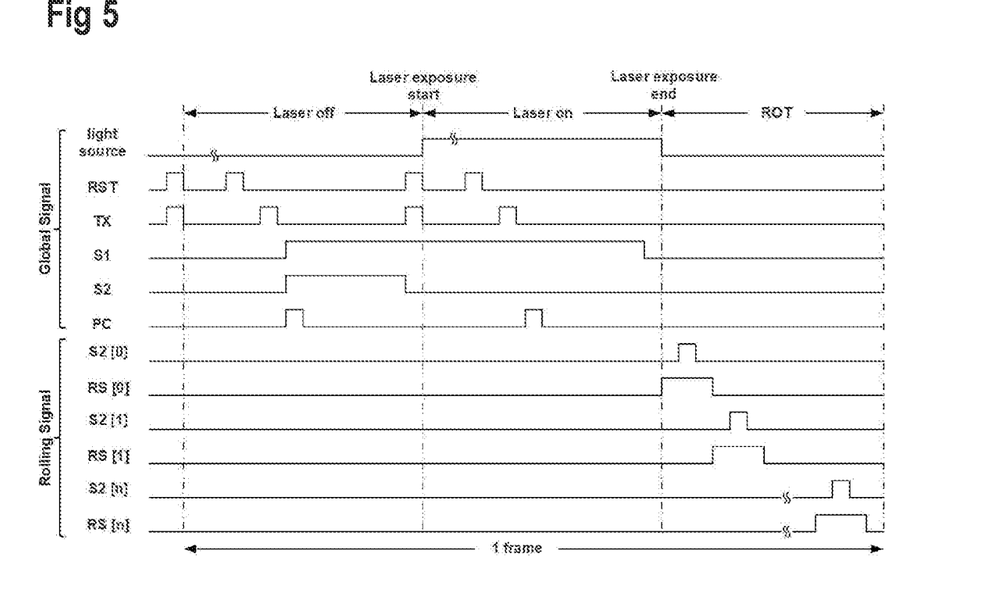
FIGS. 5 and 6 show timing diagrams for illustrating the working principle of a pixel according to the improved concept.
Figure 6:
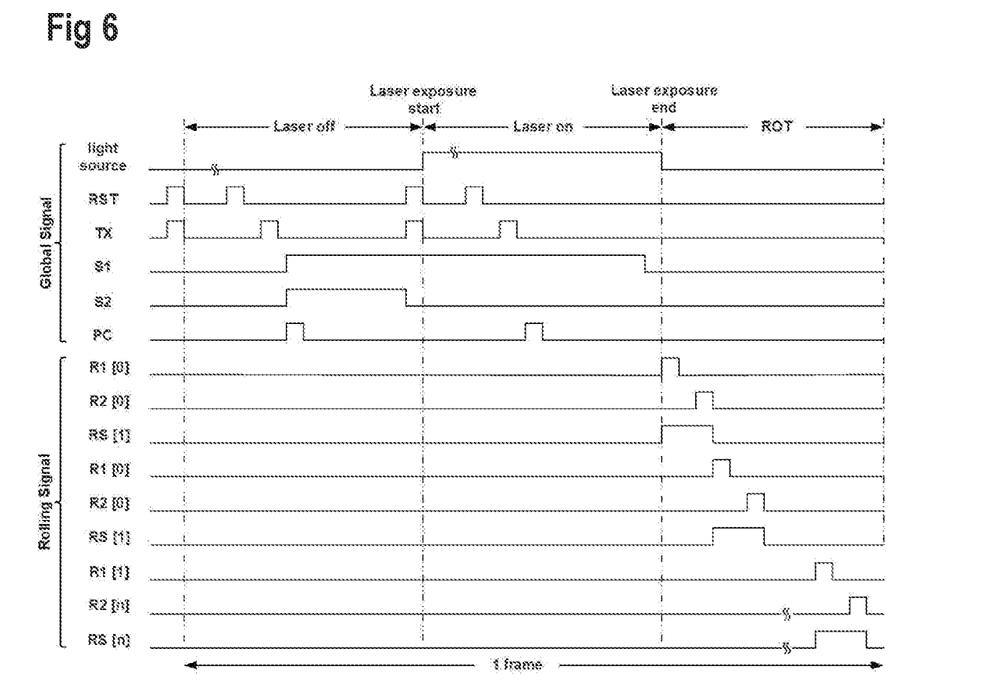

FIGS. 5 and 6 show timing diagrams for illustrating the working principle of a pixel according to the improved concept performing two exposures for enabling a background cancellation process by synchronizing the exposures with an illuminating light source.

The timing diagram of FIG. 5 shows the control signals applied to the different elements of a pixel as shown in FIGS. 1 and 2 as well as to a light source, e.g. a camera flash or a laser diode. Therein, the x-axis constitutes the time, while on the y-axis the control signals applied to the individual elements are displayed in a stacked manner. Each control signal can be understood as a signal with two discrete levels, on and off, up or down, 1 or 0. Furthermore, the dashed lines delineate three phases of the pixel operation.

In this example, during the first "laser off" phase, a first exposure is performed, during which the emission of the light source is disabled, i.e. it is switched off. During the second "laser on" phase, a second exposure is performed, during which the emission of the light source is enabled, i.e. it is switched on and outputs light at a certain output power. Finally, during a third "readout" phase, the signals from the two exposures stored within the first and second sample stages are read out.

In detail, an initial pulsing of the transfer gate 11 and the reset switch 14 before the first exposure by means of a RST and TX pulse of the control signal initiates a predefined starting state of the photosensitive element 10 and of the sense node 12. The closing of the transfer gate 11 and the reset switch 14 marks the beginning of the first exposure phase. During this entire phase, emission of the light source, here a laser, e.g. a laser emitting in the infrared domain at around 940 nm for facial recognition purposes, is disabled. A further pulsing of the reset switch 14 by means of a RST pulse ensures that the sense node 12 indeed is put in its initial state. The TX pulsing of the transfer gate 11 during the "laser off" phase marks the end of the period, in which charges are being integrated within the photosensitive device 10, and charges are transferred from the photosensitive element 10 to the sense node 12.

Subsequently, both sample switches S1 and S2 are pulsed in order to transfer the charges from the sense node 12 via the first buffer amplifier 13 to the storage capacitor of the second sample stage 22. Towards the end of the "laser off" phase, the second sample switch S2 is being opened and the photosensitive element 10 and the sense node 12 are once again reset to the initial state.

The closing of the transfer gate 11 and the reset switch 14 now marks the beginning of the second exposure phase. During this entire phase, emission of the light source is enabled. A further pulsing up the reset switch 14 by means of a RST pulse ensures once again that the sense node 12 indeed is put in its initial state. The TX pulsing of the transfer gate 11 during the "laser on" phase marks the end of the second period, in which charges are being integrated within the photosensitive device 10, and charges are transferred from the photosensitive elements 10 to the sense node 12.

As sample switch S1 is still closed, charges are directly transferred from the sense node 12 via the first buffer amplifier 13 to the storage capacitor of the first sample stage 21. Towards the end of the "laser on" phase, the first sample switch S1 is being opened. With this, both exposure phases are completed and the respective signals are stored on the storage capacitors of the first and the second sample stages 21, 22, respectively.

The steps of the two exposure phases is defined as a global signal, as the described steps are performed simultaneously on a plurality of pixels 1 of an image sensor, for instance. Hence, both exposure periods constitute a global shutter exposure of the pixel array.

During the readout phase labelled in the figure as "ROT", all photo signals stored within the sample stages 21, 22 of the pixels 1 of the pixel array are read out row by row, what is typically referred to as a rolling shutter readout process.

During this phase, the readout switch 16 is pulsed by means of a RS pulse of the control signal in order to read out the photo signals stored on the storage capacitor of the second sample stage 22 via the second buffer amplifier 23 and the column line 30. Subsequently, a pulse is applied to the second sample switch S2 for transferring the photo signals stored on the storage capacitor the first sample stage 21. The closing of the readout switch 16 of a respective row of pixels 1 then initiates the readout of the next row of pixels 1 in a corresponding manner. This is indicated in FIG. 5 by the number in brackets denoting the row number starting from zero to n for a pixel array with n rows.

As described, readout circuitry arranged either before or after the column line 30 may further process the two signals readout from each pixel by performing a background light cancellation process as described above, for instance.

The timing diagram of FIG. 6 shows the control signals applied to the different elements of a pixel as shown in FIGS. 3 and 4, having the first and the second sample stages 21, 22 arranged in a parallel configuration, as well as to a light source.

In principle, the proposed storage of two photo signals from exposures at different illumination conditions combined with the readout mechanism as described can be generally applied to conventional pixel architectures having two storage nodes without any changing at device level except for the synchronization with a light source.

It is noted that the procedure for the two exposure phases remains the same. However, due to the possibility to independently read out the photo signals from the sample stages 21, 22 via dedicated first and second readout switches R1, R2, the RT phase varies slightly from that shown in FIG. 5. Here, the readout switch 16 is opened and the first and the second readout switches R1, R2 are opened sequentially for the above-mentioned separate readout.

Figure 7:
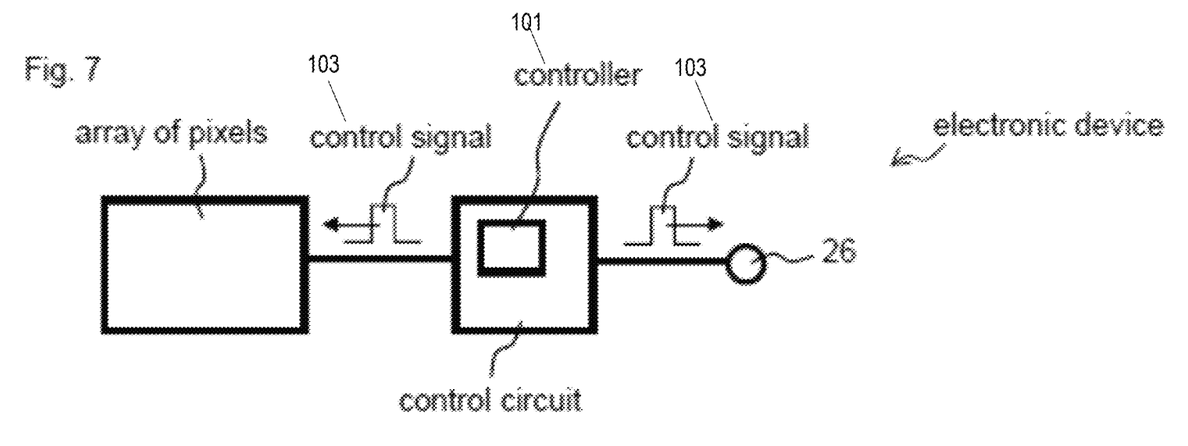
FIG. 7 shows an electronic device in accordance with embodiments of the present disclosure.

Referring now to FIG. 7, shown is an electronic device including an array of pixels, a light source, and a control circuit having a controller configured to generate the control signal for operating the array of pixels in conjunction with the light source.

It will be appreciated that the invention is not limited to the disclosed embodiments and to what has been particularly shown and described hereinabove. Rather, features recited in separate dependent claims or in the description may advantageously be combined. Furthermore, the scope of the invention includes those variations and modifications, which will be apparent to those skilled in the art and fall within the spirit of the appended claims. The term "comprising", insofar it was used in the claims or in the description, does not exclude other elements or steps of a corresponding feature or procedure. In case that the terms "a" or "an" were used in conjunction with features, they do not exclude a plurality of such features. Moreover, any reference signs in the claims should not be construed as limiting the scope.

The invention claimed is:

1. A pixel comprising:
   a photosensitive element for generating charges in response to incident radiation;
   a sense node;
   a transfer gate, connected between the photosensitive element and the sense node, for controlling transfer of charges to the sense node;
   a first buffer amplifier having an input connected to the sense node;
   a sample structure connected to an output of the first buffer amplifier, the sample structure comprising a first sample stage and a second sample stage, with the first and second sample stages being operable to sample a sample value of the sense node; and
   a readout circuit having an input connected to the sample structure and being configured to generate a first output signal by reading out a first sample value from the first sample stage and generate a second output signal by reading out a second sample value from the second sample stage, wherein
   the transfer gate and the first and the second sample stages are configured to be operated in conjunction with a light source in response to a control signal;
   the first sample stage is configured to sample a first sample value that depends on radiation incident on the photosensitive element from an object or a scene that is illuminated by the light source emitting light at a first output power;
   the second sample stage is configured to sample a second sample value that depends on radiation incident on the photosensitive element from the object or the scene that is illuminated by the light source emitting light at a second output power;
   the readout circuit is further configured to generate a differential signal from the first and the second output signals; and
   the first output power is different from the second output power.

2. The pixel according to claim 1, further comprising a control circuit having a controller that controls the transfer gate and the first and the second sample stages in response to the control signal.

3. The pixel according to claim 1, wherein the pixel comprises a controller and wherein the control signal is generated by the controller and is configured to set an output power of the light source.

4. The pixel according to claim 1, wherein the pixel comprises a controller and wherein the control signal is generated by the controller and is configured to operate the transfer gate and the first sample stage, in particular a first switch of the first sample stage, to sample the first sample value when the light source emits light at the first output power, and wherein the pixel comprises a controller and the control signal is generated by the controller.

5. The pixel according to claim 1, wherein the the pixel comprises a controller and wherein control signal is generated by the controller and is configured to operate the transfer gate and the second sample stage, in particular a second switch of the second sample stage, to sample the second sample value when the light source emits light at the second output power, and wherein the pixel comprises a controller and the control signal is generated by the controller.

6. The pixel according to claim 1, wherein the first output power is larger or smaller than the second output power.

7. The pixel according to claim 1, wherein the first output power or the second output power is zero.

8. The pixel according to claim 1, wherein the transfer gate is configured to transfer charge from the photosensitive element to the sense node when the transfer gate is opened.

9. The pixel according to claim 1, wherein the first and the second sample stages of the sample structure are arranged in series.

10. The pixel according to claim 1, wherein the first and the second sample stages of the sample structure are arranged in parallel.

11. The pixel according to claim 1, further comprising a reset switch configured to be operated in conjunction with the light source in response to the control signal, with the reset switch being connected to the sense node for resetting the sense node and/or the photosensitive element to a predetermined voltage.

12. An electronic device comprising an array of pixels according to claim 1, the light source, and a control circuit having a controller configured to generate the control signal for operating the array of pixels in conjunction with the light source.

13. A method for operating a pixel, the method comprising:
   generating by a photosensitive element charges in response to incident radiation;
   transferring the charges to a sense node via a transfer gate;
   selectively operating a first sample stage and a second sample stage of a sample structure to sample a sample value of the sense node; and
   operating the transfer gate and the first and the second sample stages in conjunction with a light source in response to a control signal;
   sampling by means of the first sample stage a first sample value that depends on radiation incident on the photosensitive element from an object or a scene that is illuminated by the light source emitting light at a first output power; and
   sampling by means of the second sample stage a second sample value that depends on radiation incident on the photosensitive element from the object or the scene that is illuminated by the light source emitting light at a second output power;
   generating a first output signal by reading out the first sample value from the first sample stage and generating a second output signal by reading out the second sample value from the second sample stage by a readout circuit having an input connected to the sample structure, wherein
   the readout circuit is further configured to generate a differential signal from the first and the second output signals; and
   the first output power is different from the second output power.

* * * * *